Figure 1:
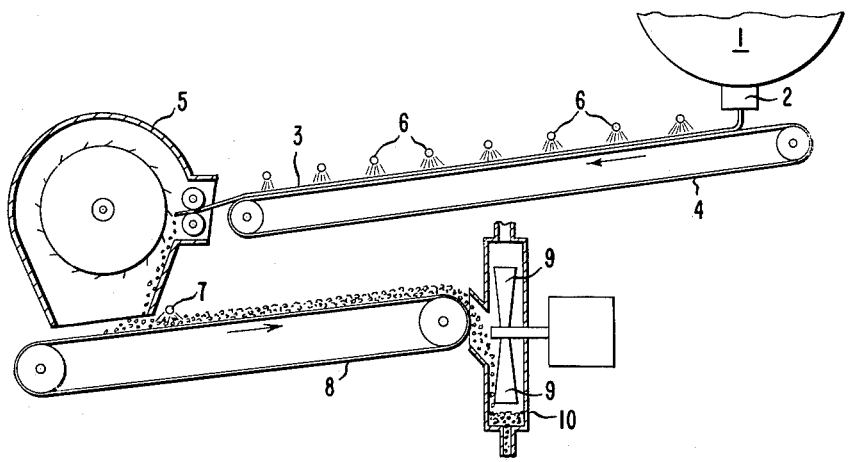

March 21, 1961 P. D. COOPER ET AL 2,975,483
PROCESS FOR PRODUCING POLYMERIC PELLETS
BY CUTTING SURFACE COOLED STRANDS
Filed Feb. 19, 1959

INVENTORS
PAUL DUNCAN COOPER
ZYGMUNT STEPHEN ZIMNY

BY *H. William Petry*

ATTORNEY

United States Patent Office 2,975,483
Patented Mar. 21, 1961

2,975,483
PROCESS FOR PRODUCING POLYMERIC PELLETS BY CUTTING SURFACE COOLED STRANDS

Paul Duncan Cooper and Zygmunt Stephen Zimny, Chattanooga, Tenn., assignors to E. I. du Pont de Nemours and Company, Wilmington, Del., a corporation of Delaware Filed Feb. 19, 1959, Ser. No. 794,330

2 Claims. (Cl. 18—47.5)

This invention relates to the manufacture of pellets of thermoplastic material and more particularly to the production of pellets of synthetic linear polyamides and polyesters.

Prior to melt-spinning of synthetic linear polyamides known as nylon, it is customary to extrude the molten polymer from the polymerization vessel in the form of a thin ribbon or sheet. The polymer ribbon is then completely cooled and cut into flake, which is then melted for spinning.

Processes of this type, however, have a number of disadvantages. For example, the irregularity of the flake size and the considerable amount of undesirable very fine material formed when the ribbon is cut preclude an even melting rate when the flake is melted for extrusion. This occurs even when the ribbon is cut at a temperature in the range of 100–150° C.

Another disadvantage in the ribbon process is the large amount of surface area exposed to air oxidation, particularly when the ribbon is air dried while still hot. A further disadvantage in this type of process is the difficulty in attaining rapid extrusion rates due to the small volume of polymer which can be extruded in this form, using equipment of practical size. High extrusion rates are very desirable in order to decrease the length of time the polymer is held in the molten state and hence the amount of thermal degradation taking place at the high temperatures involved.

It is an object of the present invention to provide an improved process for the production of pellets of thermoplastic material. Another object is to provide a process for the production of nylon pellets in which the formation of undesirable very fine particles is substantially eliminated. Another object is to provide a process in which thermal degradation and air oxidation of the thermoplastic material is greatly reduced.

The above objects are accomplished by a process which comprises extruding a molten synthetic polymeric composition in the form of a strand onto a conveyor for conveying the strands to a cutter, cooling the strands with a liquid coolant while on the conveyor so that the coolant evaporates freely at the surface of the strands, to the extent that the exterior portion only of each strand is hardened, subsequently cutting the strands to form pellets while the center portions of the strands are still plastic and thereafter completing the cooling until the pellets are hardened throughout. Preferably, the surface of the polymer strands is spray-cooled with water immediately after extrusion to effect the most efficient cooling of the strands and provide a most uniform polymer flake. Spray-cooling is also preferred in that it is not only more economical than conventional tank cooling, but also it eliminates the disruptive turbulent effects on the strand and pellets, when such cooling is utilized.

Figure 2:
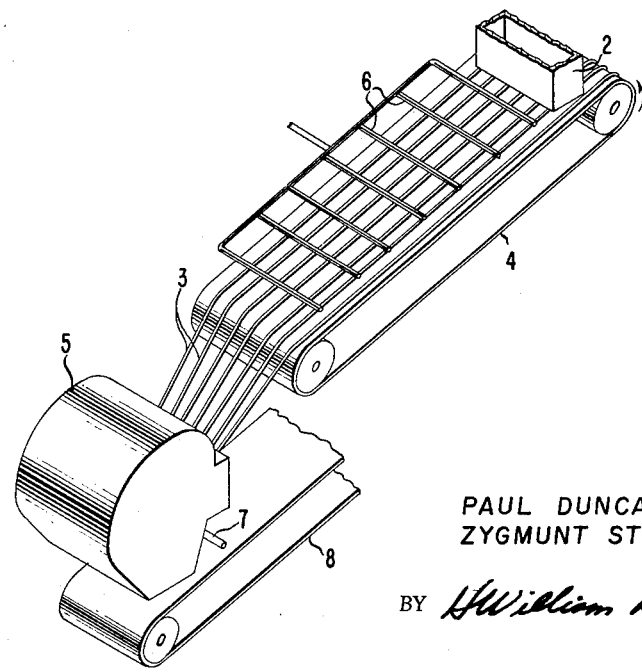

Apparatus suitable for carrying out the invention is shown schematically in the accompanying drawings. Figure 1 is a schematic drawing of the equipment used to carry out applicant's novel process. Figure 2 is a top view of the strands of polymer being carried from the extruder.

Molten polymer is extruded from the polymerization vessel 1 through a die 2 to form strands 3 which are deposited on a conveyor 4 as shown in Figure 1. The extruded polymer strands are forwarded by means of the conveyor to a cutter 5, as shown in Figure 1. Immediately after extrusion, the polymer strands are coated throughout their lengths with water from sprays 6 to cool and harden the exterior portion only of the strands as they are conveyed to cutter 5. Additional sprays are positioned along the path of the conveyor as needed to achieve the desired cooling effect. The strands are then cut into pellets before the interior portion of the strands has hardened and the pellets subjected to additional spraying with water from sprays 7 to complete the cooling. The pellets are carried away from the cutter by wovenwire belt-conveyor 8, which permits drainage of the water from the final cooling spray. Drying is achieved by subjecting the pellets to a centrifugal action in an air stream produced by dewatering fan 9 to remove the greater portion of the water, after which the pellets enter a conventional receiver (not shown) for blending and storage. The small percentage of water remaining is further reduced by evaporation due to residual heat in the pellets.

The strands are cut while the center portion is still plastic. This may be readily accomplished for a given size strand by adjusting the length and speed of the conveyor appropriately. The extrusion rate must, of course, be synchronized with the conveyor speed. The cutting of the strands while they are too soft may be avoided by examining the strands as they approach the cutting station to be sure that they are substantially hard on the exterior. Minor adjustment may be made by observing the cleanness of the cut, i.e., the absence of irregular fractures with the attendant production of fine particles. In addition, however, the optimum cutting conditions may be achieved by the following procedure:

The length and speed of the conveyor is adjusted as described above so that the exterior of the strands is hardened by the time the strands reach the cutter. The ends of the cut pellets are then examined closely. When the optimum cutting range has been achieved, the ends of most of the pellets exhibit smooth cuts and a definite core effect, i.e., the central portion of the pellet cross section will have a different appearance from the outer portion. In some instances, it will be observed that the center portion has bulged slightly, while in other cases the center portion will be depressed, both conditions resulting from the slight plastic flow occurring during the cutting operation. When this core effect is non-existent or virtually non-existent in most of the pellets, the speed of the conveyor may be increased or other conditions modified to lessen the cooling of the strands before entering into the cutter. When an examination of the pellets shows irregular cutting with no production of fine particles and excessive bulging of the center portion, the strands are insufficiently quenched and the cooling conditions are adjusted to give increased quenching.

The optimum cutting range is readily determinable in accordance with the above procedure. Generally, however, an optimum cutting range is most economically and practically achieved when the extruded strand is cooled with a liquid coolant at a temperature up to about 70° C. for a period of from about 1.5 to about 6 seconds. Higher temperature coolants are suitable, of course, but the exposure time should be likewise increased. The above conditions are preferred in that high melting polymers, i.e., polymers melting at temperatures above 250° C., may be extruded at higher rates than before under these conditions, for example, at rates up to about 170 lbs./min. This process is also facilitated by evaporation of coolant during the cooling procedure prior to cutting.

*Example*

Polyhexamethylene adipamide, prepared as described in U.S. 2,163,636, is extruded from an autoclave downwardly through an extrusion die at a rate of about 150 pounds per minute onto a moving conveyor belt.

The extrusion die has 31 holes, each $9/64$ x $27/64$ inches in cross section, arranged in a single line with $1/4$ inch spacing between the long dimension. The flow rate is controlled by a valve located immediately above the extrusion die. The valve and die assembly are electrically heated in an insulated enclosure to maintain a polymer temperature of 270–275° C. A water spray situated immediately ahead of the extrusion position forms a film of water on the moving conveyor belt and extruded polymer strands. Additional water sprays are located at one-foot intervals down the 15-foot length of the conveyor belt to adequately cool the exterior portion of the strands prior to cutting. The sprays are operated at an average rate of flow of about 5 gallons per minute from each spray, the temperature of the water being approximately 15° C. The rubber impregnated canvas conveyor belt has slightly raised edges to prevent drain-off of water over the edges of the belt. At a point about 6 feet from the discharge end of the conveyor, lined shields are placed in a manner to converge the group of strands from the original 23-inch spread across the width of the conveyor to approximately a 13-inch spread so that they may be readily fed into the 14-inch commercial Taylor-Stiles rotary cutter. The strands are then passed between two feed rolls of $2 1/2$ inch diameter, the drives of the feed rolls being integrated with the drive of the cutter rotor assembly so that a uniform $3/16$ inch length of strand is fed to the bed knife between each fly knife on the roller assembly. The peripheral speed of the feed rolls is slightly (about 5%) higher than the lineal speed of the conveyor belt (moving at about 375 feet per minute) in order to provide a positive pulling of the strands from the belt.

The cut pellets drop downwardly into the lower end of a woven wire belt conveyor and are immediately sprayed with water to prevent thermal degradation. Two sprays having a flow rate of about three gallons per minute each are employed for this purpose. In addition, a great portion of water from the strand conveyor flows through the cutter and aids in quenching the cut particles. The conveyor belt is constructed of stainless steel woven wire to permit drainage of the water. After leaving the conveyor, the damp flake is subjected to further dewatering to remove a major portion of the surface water. This dewatering system consists of a blower with a perforated inner scroll to permit centrifugal removal of water and a conveying duct system having five right angle elbows. The outer surface of these elbows is perforated to permit additional removal of water from the wet pellet/air mixture being conveyed in the duct system. Pellets leaving the dewatering duct system enter a conventional receiver for blending and storage. The temperature of the pellets on leaving the dewatering system is about 90° C. and this residual heat serves to reduce the moisture content to a level of about 0.3%.

Examination of the cut pellets shows that they have a definite core surrounded by an outer shell which differs in appearance from the central portion. The pellets are about $1/16$ to about $3/32$ inch thick, from about $3/16$ to $5/16$ inch in width, and about $5/32$ inch in length. There is no noticeable quantity of fine particles, nor any indication of yellowness or other discoloration due to thermal degradation. When used in subsequent melt-spinning operations, the pellets melt much more uniformly than conventional flake, due to their more uniform size and consequently, the resulting filaments are more uniform.

Cutting of the polymer strands after the outer portion has hardened but while the center portion is still plastic eliminates irregular breaking of the polymer and thus eliminates the fine particles and irregularly shaped pieces which otherwise result when a high melting polymer, such as nylon, is cut after complete hardening, i.e., after cooling below a temperature of about 150° C. for a sufficient period of time. In addition, the partially plastic strands are relatively easy to cut, reducing the power requirements for the cutter and the frequency with which the blades must be sharpened.

The size of the strands may be adjusted as desired to give pellets of any desired size. For polymers such as nylon, which are to be used in the melt-spinning of fibers, the preferred thickness of the strand is in the range of from about $3/64$ to about $1/8$ inch and the preferred width is from about $3/16$ to about $1/2$ inch. The length of the cut pellets is preferably in the range of from about $3/32$ to about $1/2$ inch. The size of the strand will usually be somewhat smaller than that of the orifice from which it is extruded and, therefore, suitable adjustment must be made for this.

In the extrusion of a high melting polymer, such as nylon, which is subject to discoloration and degradation when exposed to air at elevated temperatures, the polymer surface may be coated with water immediately after extrusion and cooled until the temperature is reduced to a safe level. In the present process, this is accomplished by spraying with water before the polymer is cut, cutting the strands while wet and spraying with additional water after cutting. Although sprays are conveniently used for this purpose, the water may be applied by any suitable means which permits evaporation of the water or other coolant freely at the surface of the strands. Tap water, which ordinarily has a temperature in the range of about 10° to 30° C., is satisfactory for this purpose. The volume of water required will depend on other prevailing conditions. However, in general, sufficient water should be used to permit evaporation at the polymer surface. Evaporation at the surface of the strands is highly desirable in that a most efficient cooling is provided, thereby greatly reducing the degradation effect where inefficient cooling is encountered.

The pellets should be cooled on the exterior to a temperature below about 110° C. before removal of the water to avoid air oxidation. It is desirable, however, that the temperature at this point be high enough to aid in evaporating moisture remaining after draining the water from the pellets.

While the process of this invention is particularly suitable for high-melting polyamides and polyesters such as polyhexamethylene adipamide and polyethylene terephthalate, the invention is applicable broadly to all types of synthetic polymers which are capable of being melt extruded. Suitable polyamides and copolyamides which can be employed in the process of this invention include those described in U.S. Patents 2,071,350; 2,071,253; 2,130,523; 2,130,948; 2,190,770; 2,252,555; 2,252,557; and 2,374,137. Some of the suitable polyesters and copolyesters are shown in U.S. Patents 2,071,250; 2,071,251; 2,465,150; and 2,465,319.

When non-uniform flake is melted, the finer particles melt prior to the larger sizes and, as a result, some of the polymer is kept at the melting temperature for a period sufficient to effect undesirable degradation.

The thermoplastic pellets produced by the process of this invention, being much more uniform in size than conventional flake, are particularly suitable for use in the melt spinning of filaments. These pellets may also be used in the shaping of plastic articles of any form or may be dissolved in suitable solvents for shaping into filaments or other shaped articles.

We claim:

1. An improved high-speed process for producing uniform pellets of a synthetic polymeric composition, comprising the steps of continuously extruding a molten synthetic polymeric composition in the form of a plurality of laterally spaced parallel strands, continuously conveying said spaced parallel strands through a first water spray cooling zone, cooling continuously and solidifying the exterior portions only of said spaced strands by evaporation of part of the water sprayed thereon during passage of said strands through said first cooling zone, continuously cutting said partly solidified spaced strands into discrete pellets after said laterally spaced strands have emerged from said first cooling zone and before significant further cooling and solidification of the interior portions of said strands has occurred, and then completely cooling said pellets to a solidified condition throughout, the strands and pellets being maintained wet throughout the cooling and cutting steps to minimize thermal oxidative degradation of the polymeric composition.

2. An improved continuous high-speed process for forming uniform synthetic polymeric pellets of controllable size, comprising the steps of extruding a plurality of laterally spaced parallel strands from a molten mass of synthetic polymer, conveying said laterally spaced strands through a first cooling zone to a cutting zone, solidifying the exterior surfaces only of said spaced strands during passage through said cooling zone by applying a limited water spray to said strands and evaporating part of said water to cool only the outer surface of said strands, slicing through said spaced partly solidified strands by rapid cutting action transversely to the strand axes at said cutting zone to produce a number of uniform discrete pellets while a substantial inner portion of the strands and pellets remains in heated unsolidified condition, conveying said pellets through a second cooling zone, and further cooling said pellets by water spraying during passage through said second cooling zone to completely solidify said pellets while preventing oxidation degradation of the pellet material during cooling.

References Cited in the file of this patent

UNITED STATES PATENTS

| | | |
|---|---|---|
| 2,319,040 | Conklin | May 11, 1943 |
| 2,335,515 | Jehle | Nov. 30, 1943 |
| 2,834,053 | Bilanin et al. | May 13, 1958 |